Figure 4:
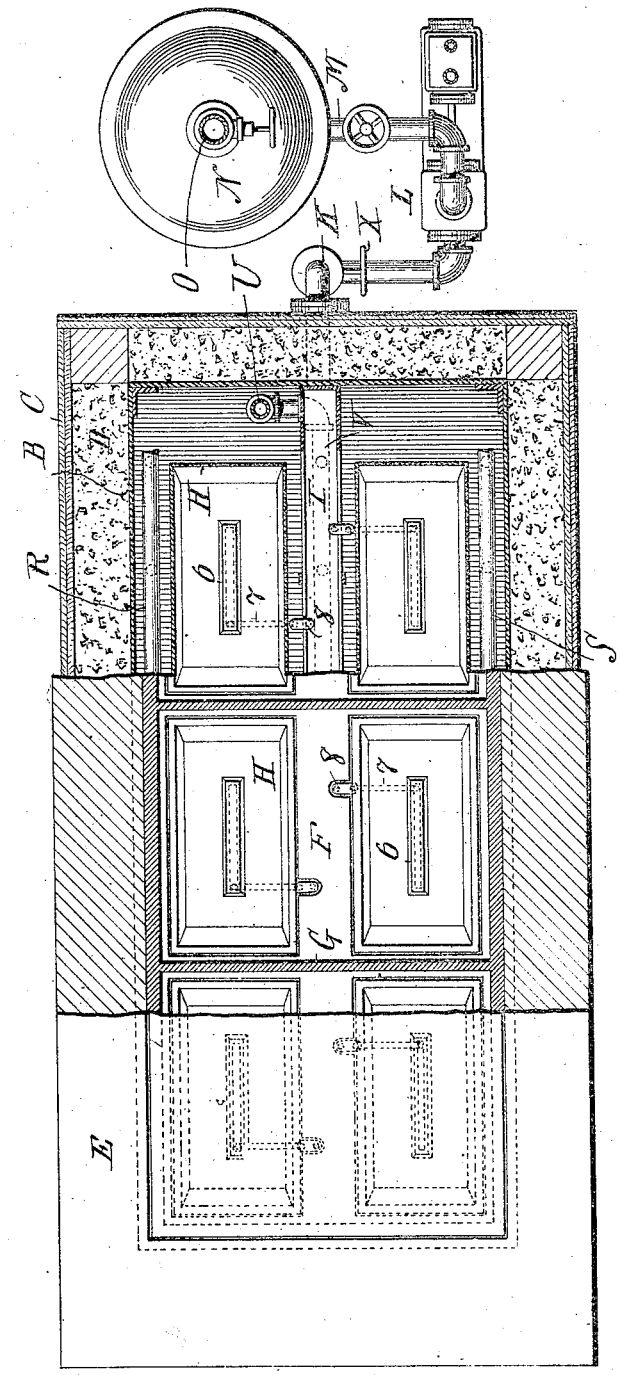

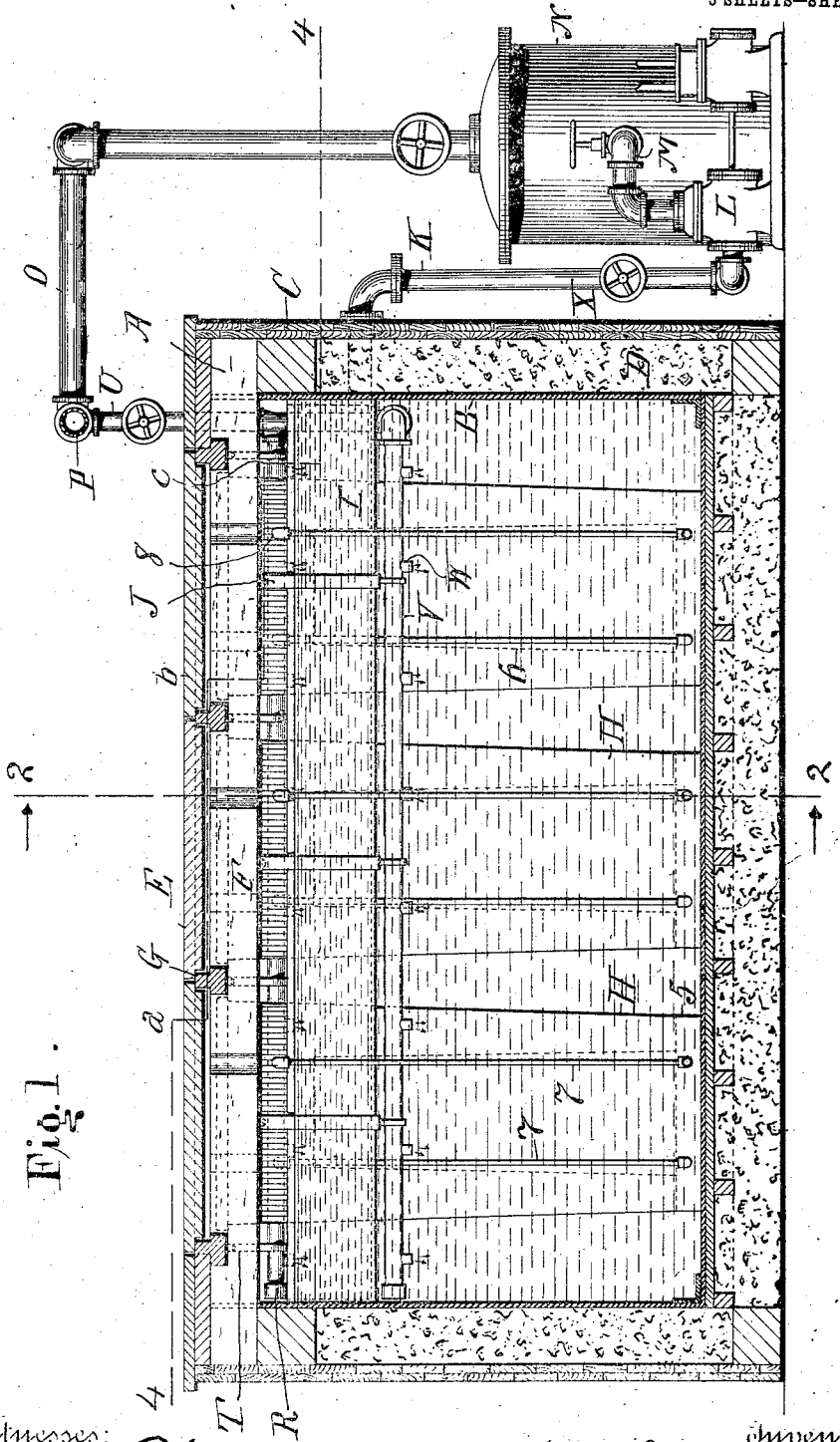

C. D. HAVENSTRITE.
APPARATUS FOR MAKING CAN ICE.
APPLICATION FILED AUG. 17, 1908.
943,226.
Patented Dec. 14, 1909.
3 SHEETS—SHEET 2.
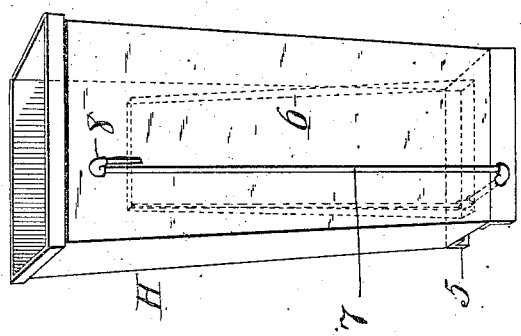
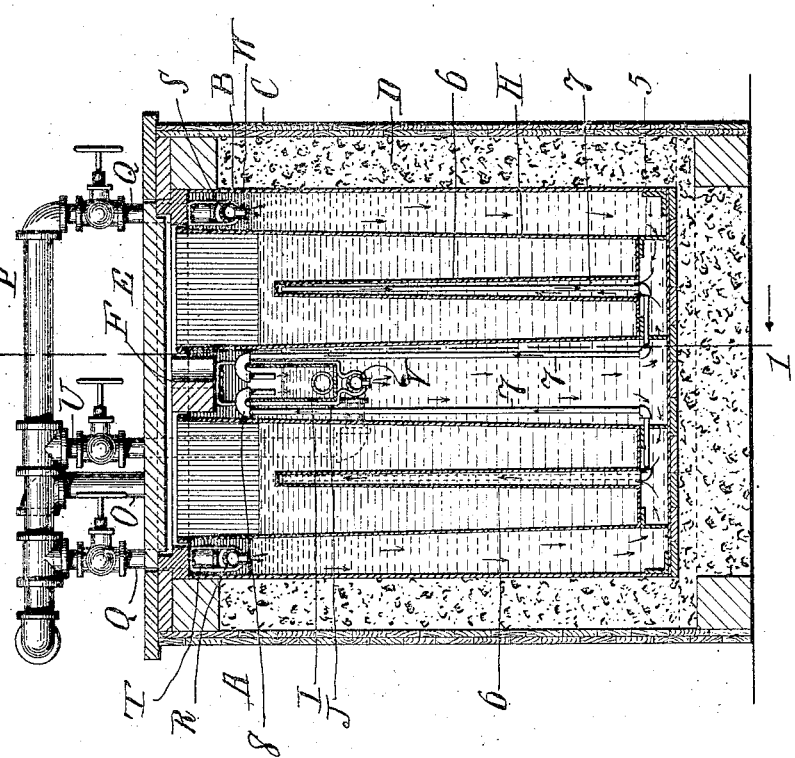

C. D. HAVENSTRITE.
APPARATUS FOR MAKING CAN ICE.
APPLICATION FILED AUG. 17, 1908.

943,226.

Patented Dec. 14, 1909.
3 SHEETS—SHEET 3.

Witnesses:
Gertrude T. Porter.
May T. McGarry.

Inventor
Charles D. Havenstrite
By his Attorney

UNITED STATES PATENT OFFICE.

CHARLES DAVID HAVENSTRITE, OF NEWARK, NEW JERSEY.

APPARATUS FOR MAKING CAN-ICE.

943,926.

Specification of Letters Patent. Patented Dec. 14, 1909.

Application filed August 17, 1908. Serial No. 448,918.

*To all whom it may concern:*

Be it known that I, CHARLES D. HAVENSTRITE, a citizen of the United States, residing at Newark, in the county of Essex and State of New Jersey, have invented a certain new and useful Improvement in Apparatus for Making Can-Ice, of which the following is a specification.

The invention is an apparatus for the manufacture of can ice. It has for its object to lessen the length of time required to freeze can ice with a given temperature of refrigerating liquid, to decrease the number of cans and size of tank, to freeze clear ice from undistilled water by using refrigerating liquid of a higher temperature, thus doing away with water distilling apparatus and permitting greater economy of operation, and lower first cost of plant than is now practicable with standard can ice making plants. In such standard plants, the refrigerating liquid is usually maintained at a temperature of from 12° to 16° F. In this liquid, cans open at the top are immersed and filled with water to be frozen. With liquid at the above temperatures, the water in a standard 300 pound can will be frozen solid in from 60 to 70 hours. The freezing takes place inwardly from the sides and bottom of the can, the ice closing in at the center. In order to freeze commercially clear ice it is necessary to use distilled water from which the air has been expelled by reboiling. This distilled water is obtained from the exhaust steam of the ammonia compressor, pumps, etc., and as these machines usually do not furnish enough steam to make the necessary amount of distilled water, live steam from the boiler is necessary. The fuel economy of a standard can plant is therefore determined mostly by the ability of distilling the necessary amount of water. Commercially clear ice may be produced in a standard can from undistilled water if the brine is carried at a high temperature of from 26° to 30° F. so that the ice will form very slowly, but as the number of cans and size of tank becomes too great the distilling apparatus is used. If the temperature of the brine around a standard can be lowered, say below 12° F., the ice will not freeze clearly, even with good distilled water, and in removing ice from the can so frozen, checking and cracking of the ice results so that low temperatures are commercially impossible.

My invention consists first in the construction of the can, which is provided with a central hollow projection open through the bottom of the can and placed with reference to the inner surface of the can so that the distance between said inner surface and the surface of said projection, measured in any given cross sectional plane parallel to the bottom of the can, shall be everywhere the same. This projection, when freed from air, permits the refrigerating liquid to rise and be circulated therein, so that its surfaces become freezing surfaces; and by reason of their proximity to the bounding surfaces of the can, and their placing as described with respect to said can surfaces, reduce the distance through which the ice is frozen to less than half that present in the standard can in which no internal projection exists. I have found, that with a can thus constructed, I can freeze a block of ice 11 inches thick in 16 hours using brine of 16° Fahr., thus reducing the time of freezing to one quarter that required to make a block of ice of like dimension in the standard can. Also, that by raising the brine temperature to 28° Fahr., and allowing 64 hours' freezing time, undistilled water may be used. Although water from which standard can ice is made is practically free from air when placed in the cans, the great length of time during which it lies exposed to the air during the freezing, results in a large reabsorption of air and the production of a prominent white core in the otherwise clear block of ice. On the other hand, owing to the much shorter exposure of the water in my can to the air, the absorption of air is greatly reduced with consequent reduction of opaque core. In order that the surfaces of the hollow projection in the can may be true freezing surfaces to produce the results stated, it is necessary, first, that no air shall be imprisoned in said projection and second, that there shall be a circulation of refrigerating liquid therein.

My invention further consists in the means for effecting these results, for securing regulated speed of circulation, and it also includes the construction of the apparatus, as more particularly pointed out in the claims.

In the accompanying drawings—Figure 1 is a longitudinal vertical section of my apparatus on the line 1, 1, of Fig. 2. Fig. 2 is a transverse vertical section on the line 2, 2, of Fig. 1. Fig. 3 is a perspective view of one of the freezing cans. Fig. 4 is a partial plan and horizontal section on the lines 4ª, a, b, b, c, and c, 4, of Fig. 1.

Similar numbers and letters of reference indicate like parts.

A is a tank having inner walls B and outer walls C, with an intervening packing of heat insulating material D. E is a removable cover made in sections. In the upper part of the tank is a frame formed of longitudinal members F and transverse members G, the quadrangular intervening spaces being of sufficient size to permit the introduction into the tank, through each space, of a freezing can H. Said cans when in place, rest on the bottom of the tank and are thus immersed in the refrigerating liquid which is supplied to said tank in the manner hereinafter to be described.

Each freezing can H, as shown in Fig. 3, is a vessel of sheet metal preferably having its walls downwardly inclined, so that it is of less cross sectional area at the bottom than at the top. On the bottom of the can are two supporting flanges 5 which rest on the bottom of the tank, so that a space is formed beneath said can. Within the can and rising upwardly from the bottom is a hollow projection 6, open at its lower end. 7 is a U-shaped pipe, one leg of which extends through the opening at the bottom of the projection and upwardly into said projection, while the other leg extends upwardly on the outside of the can, the intermediate portion passing below the bottom of the can and through one of the supporting flanges 5, said pipe being secured to the can in any suitable way. At the upper extremity of the pipe 7 is a return bend 8, which extends downward for a short distance below the liquid level in the tank. The cans H are placed in two rows, as shown in Fig. 2 and so that the bent over ends 8 of said pipes 7 will all enter a trough I which extends longitudinally across the tank. Said trough is closed at its ends and is preferably hung by straps J from a longitudinal member F of the grid.

Communicating with one end of the trough I is a pipe K leading to the suction end of a pump L, which pump delivers by pipe M into a cooler N for the refrigerating liquid. This cooler may be of any suitable construction and connected with any refrigerating machine. From the cooler extends a pipe O communicating with a transverse header P above the tank A, and from this header extend vertical pipes Q communicating with the longitudinal pipes R, S, which are disposed in the upper part of the tank A between the cans and the pipe walls. The pipes R, S, are preferably hung in straps T from the outer longitudinal members F of the frame. A third vertical pipe U extends downwardly from the header P, and communicates with another longitudinal pipe V which is supported below the trough I by the straps J, which straps also support said trough.

The operation is as follows: The refrigerating liquid is caused to circulate through the cooler N by means of the pump L, and is delivered into the tank through the perforated pipes R, S, V, the openings in the wall of which pipes being preferably provided with short tubular extensions W. Said liquid then passes upwardly in the can projections 6 to the top thereof, and then by the pipes 7 is delivered into the trough I, whence it discharges by pipe K to the suction end of pump L, whereby it is again forced through the cooler N and returned to the tank. The pipes 7 serve first, to free the can projections 6 from air, thus allowing the refrigerating liquid to rise therein. The surfaces of said projections 6 then become freezing surfaces, so that, by reason of their proximity to the can surfaces, as already stated, the distance through which the ice is frozen is less than half that existing between the freezing surfaces of the standard can, and the freezing time is reduced from about 70 hours to about 16 hours. Second, to cause a circulation of the refrigerating liquid through said projection. To this end the return bend 8 is extended downward below the level of the refrigerating liquid in the tank, so that a siphon action is produced, whereby the liquid is drawn from the projection 6 into the trough I whence, as already described, it is removed by the pump L, and returned to the tank. By raising or lowering the liquid level in the trough I, a slow or rapid circulation of the liquid may be established, each siphon passing the same quantity of liquid. This raising or lowering of said liquid level may be regulated by means of the valve X in discharge pipe K, or by varying the speed of pump L. It is preferable that the top edges of the trough I should be only slightly above the liquid level in the tank; and, of course, the trough should be deep enough to accommodate the siphons. The act of quickly lowering the can into the tank is sufficient to cause its siphon to flow, as the refrigerating liquid will enter the pipes 7 after the air has left with sufficient force to rise over the edge of the trough and start downward flow into the same. But obviously, any suitable extraneous means for starting said flow may be used.

It will be observed from Fig. 3 that the can H with its pipe 7 forms a structure complete in itself, and easily introduced or removed from the tank without separating the pipe from the can. Also that said projection decreases in cross sectional area from bottom to top while the can similarly decreases from top to bottom. Also from Fig.

4, that the internal hollow projection in said can is placed with reference to the inner surface of the can so that the distance between said inner surface and the surface of said projection, measured in any given cross sectional plane parallel to the bottom of the can, shall be everywhere the same. Hence, all of the opposing faces of the ice layers formed on said surfaces may be caused simultaneously to meet during the freezing operation, and to unite to form a single solid ice cake. In another application for Letters Patent Serial No. 448,919, filed simultaneously herewith, I have claimed the process of making can ice which consists in freezing water between the outer surface of an internally refrigerated chamber and the inner surface of an externally refrigerated casing inclosing said chamber, the distance between said surfaces, measured in any given cross sectional plane parallel to the bottom of the casing, being everywhere the same, and continuing the operation until all the opposing faces of the ice layers formed on said surfaces simultaneously meet and unite to form a single ice cake.

I claim:

1. In an apparatus for making can ice, a tank for containing refrigerating liquid, a freezing can having an internal hollow projection open at its lower end and extending upwardly from the bottom of said can, and a siphon device for causing a circulation of refrigerating fluid in said projection.

2. In an apparatus for making can ice, a tank for containing refrigerating liquid, a freezing can having an internal hollow projection open at its lower end and extending upwardly from the bottom of said can, a siphon device for causing a circulation of refrigerating liquid in said projection, and means for varying the speed of delivery of said siphon.

3. In an apparatus for making can ice, a tank for containing refrigerating liquid, a freezing can having an internal hollow projection open at its lower end and extending upwardly from the bottom of said can, a siphon device for withdrawing the fluid contents of said projection and a receptacle in said tank for receiving the discharge from said siphon.

4. In an apparatus for making can ice, a tank for containing refrigerating liquid, a freezing can having an internal hollow projection open at its lower end and extending upwardly from the bottom of said can, a siphon device for withdrawing the fluid contents of said projection, a receptacle in said tank for receiving the discharge from said siphon, and means for withdrawing liquid from said receptacle and delivering the same back to said tank.

5. In an apparatus for making can ice, a tank for containing refrigerating liquid, a freezing can having an internal hollow projection open at its lower end and extending upwardly from the bottom of said can, a siphon device for withdrawing the fluid contents of said projection, a receptacle in said tank for receiving the discharge from said siphon, and means for varying the level of the liquid in said receptacle.

6. In an apparatus for making can ice, a tank for containing refrigerating liquid, a plurality of freezing cans, each having an internal hollow projection open at its lower end and extending upwardly in the can, siphon devices respectively communicating with the projections in said cans, a receptacle in said tank receiving the delivery from all of said siphon devices and means for varying the liquid level in said receptacle, whereby the speed of circulation of liquid in all of said siphons may be simultaneously varied.

7. In an apparatus for making can ice, a tank for containing refrigerating liquid, a plurality of freezing cans, each having an internal hollow projection open at its lower end and extending upwardly in the can, siphon devices respectively communicating with the projections in said cans, a receptacle in said tank receiving the delivery from all of said siphon devices, horizontal pipes having perforated walls disposed in said tank, and means for withdrawing liquid from said receptacle and delivering the same into said pipes.

8. In an apparatus for making can ice, a tank for containing refrigerating liquid, a plurality of freezing cans disposed in two rows and each having an internal hollow projection open at its lower end and extending upwardly in the can, siphon devices respectively communicating with the projections in said cans, and a trough disposed between said rows of cans and receiving the delivery from all of said siphon devices.

9. In an apparatus for making can ice, a tank for containing refrigerating liquid, a plurality of freezing cans disposed in two rows and each having an internal hollow projection open at its lower end and extending upwardly in the can, siphon devices respectively communicating with the projections in said cans, a trough disposed between said rows of cans and receiving the delivery from all of said siphon devices, horizontal pipes having perforated walls respectively disposed in said tank to alternate with said rows of cans, and means for withdrawing liquid from said trough and delivering the same into said pipes.

10. The combination of a can having an internal hollow projection open at its lower end and extending upwardly from the bottom of said can, and, supported on said can, a substantially U-shaped pipe having one leg extending vertically into said hollow projection and the other leg extending vertically on the outside of said can.

11. The combination of a can having an internal hollow projection open at its lower end and extending upwardly from the bottom of said can, and, supported on said can, a substantially U-shaped pipe having one leg extending vertically into said hollow projection and the other leg extending vertically on the outside of said can, and the intermediate portion extending below the bottom of said can.

12. The combination of a can having an internal hollow projection open at its lower end and extending upwardly from the bottom of said can, and supported on said can, a substantially U-shaped pipe having one leg extending vertically into said hollow projection and the other leg extending vertically on the outside of said can, and a return bend at the upper extremity of said last named leg.

13. The combination of a can having an internal hollow projection open at its lower end and extending upwardly from the bottom of said can, supports extending downwardly from said bottom, and a substantially U-shaped pipe having one leg extending vertically into said hollow projection, the other leg extending vertically on the outside of said can, and the intermediate portion passing through one of said supports.

14. As a new article of manufacture and sale, a freezing can gradually diminishing in cross sectional area from top to bottom, and an internal hollow projection open at its lower end and extending upwardly from the bottom of said can, and gradually diminishing in cross sectional area from bottom to top, the distances between the surfaces of said projection and the opposite surfaces of said can, measured in any given cross sectional plane parallel to the bottom of the can, being everywhere the same.

In testimony whereof I have affixed my signature in presence of two witnesses.

CHARLES DAVID HAVENSTRITE.

Witnesses:
 GERTRUDE T. PORTER,
 MAY T. MCGARRY.